(12) United States Patent
Yuan et al.

(10) Patent No.: US 12,248,390 B2
(45) Date of Patent: Mar. 11, 2025

(54) LOCKLESS LOG AND ERROR REPORTING FOR AUTOMATIC TEST EQUIPMENT

(71) Applicant: ADVANTEST CORPORATION, Tokyo (JP)

(72) Inventors: Chi Yuan, San Jose, CA (US); Srdjan Malisic, San Jose, CA (US)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 18/128,931

(22) Filed: Mar. 30, 2023

(65) Prior Publication Data
US 2024/0176721 A1  May 30, 2024

Related U.S. Application Data

(60) Provisional application No. 63/440,373, filed on Jan. 20, 2023, provisional application No. 63/429,061, filed on Nov. 30, 2022.

(51) Int. Cl.
*G06F 11/34* (2006.01)
*G06F 11/07* (2006.01)

(52) U.S. Cl.
CPC ...... *G06F 11/3476* (2013.01); *G06F 11/0787* (2013.01)

(58) Field of Classification Search
CPC .................. G06F 11/3476; G06F 11/0787
See application file for complete search history.

(56) References Cited

U.S. PATENT DOCUMENTS

| 7,523,366 B2 * | 4/2009 | Chung | G11C 29/44 365/201 |
| 8,666,691 B2 * | 3/2014 | Ishikawa | G01R 31/31711 714/724 |
| 9,563,546 B2 * | 2/2017 | Michelsen | G06F 11/3672 |

FOREIGN PATENT DOCUMENTS

| CN | 105893252 A | 8/2016 |
| TW | 201833570 A | 9/2018 |
| TW | 202107283 A | 2/2021 |
| TW | 202202865 A | 1/2022 |

* cited by examiner

*Primary Examiner* — Nadeem Iqbal

(57) ABSTRACT

Device testing techniques including allocating a log memory, testing a device, and storing test result during testing of the device in the allocated log memory. The allocated log memory can be accessed through an application programming interface (API) during testing of the device, wherein the allocated log memory remains unlocked during testing of the device.

20 Claims, 3 Drawing Sheets

LOCKLESS LOG AND ERROR REPORTING FOR AUTOMATIC TEST EQUIPMENT

CROSS-REFERENCE TO RELATED APPLICATIONS

This application claims the benefit of U.S. Provisional Patent Application No. 63/429,061 filed Nov. 30, 2022 and U.S. Provisional Patent Application No. 63/440,373 filed Jan. 20, 2023, both of which are incorporated herein in their entirety.

BACKGROUND OF THE INVENTION

Automatic test equipment (ATE) are apparatuses that are utilized to perform tests on devices under test (DUTs) such as, but not limited to electronics systems and components. ATE can include a number of instruments capable of automatically testing, characterizing performance, diagnosing faults, and the like.

The ATE can include a host device tester (also referred to as a controller), one or more source and capture instruments, that are coupled to one or more DUTs by one or more load boards (also referred to as primitives, handlers or probes). The host device tester, which can be a computer, generally synchronizes the one or more source and capture instruments. Generally, the ATE logs data and provides for error reporting. However, conventional data logging techniques require locking the log memory before the log can be cleared, disabled or returned to the user for analysis or display. Conventional solution may further require multiple log memories. Solutions that involve locking a log memory before access, clearing or modifying the log typically require large amounts of memory and may delay testing or other functions until the log is unlocked. This results in substantial added overhead and may reduce test and/or debug performance. Moreover, conventional logs are typically stored in operation system kernel space, which means that they are not readily accessible to the user for writing directly to the log. Waiting until a test is complete to access or modify log memory can substantially reduce test efficiency. Therefore, there is a continuing need for improved log and error reporting techniques for ATEs.

SUMMARY OF THE INVENTION

The present technology may best be understood by referring to the following description and accompanying drawings that are used to illustrate embodiments of the present technology directed toward lockless log and error reporting for automatic test equipment (ATE).

In one embodiment, a method of testing one or more devices under test (DUTs) include pre-allocating a log memory for storing test results of the one or more DUTs. A test program is executed to test the one or more DUTs after allocation of the log memory. During testing of the one or more DUTs, commands can be issued for access the log memory using an application programming interface (API), wherein the log memory remains unlocked during testing of the one or more DUTs. The log memory can be allocated in a user space memory. The log memory can be allocated in a Linux kernel module that provides a user space API configured to access entries stored in the log memory. In one implementation the allocated log memory can store 2048 entries. The API can include an instruction to clear the log memory, an instruction to read entries from the log memory, an instruction to return entries from the log memory to a user, and an instruction to disable logging to the log memory.

In another embodiment, an ATE architecture can include a host device tester. The host device tester can include a user application space, an operating system kernel space and a tester application. The operating system kernel space can be configured for loading a log driver module and DUT driver module in the user application space and allocating log memory for the log driver module. The DUT driver module provides for transferring test parameters and test results for a DUT through a write API to the allocated log memory of the log driver module. The tester application can be configured for enabling, disabling, dumping and clearing log data through a log API to the allocated log memory of the log driver module. The allocated log memory remains unlocked during testing of a DUT.

In yet another embodiment, a method of testing one or more devices can include allocating a log memory. After allocating the log memory, the one or more devices can be tested. During testing, test results can be stored in the allocated log memory. Furthermore, the allocated memory can be accessed through an API during testing of the one or more devices, wherein the allocated log memory remains unlocked during testing of the one or more devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
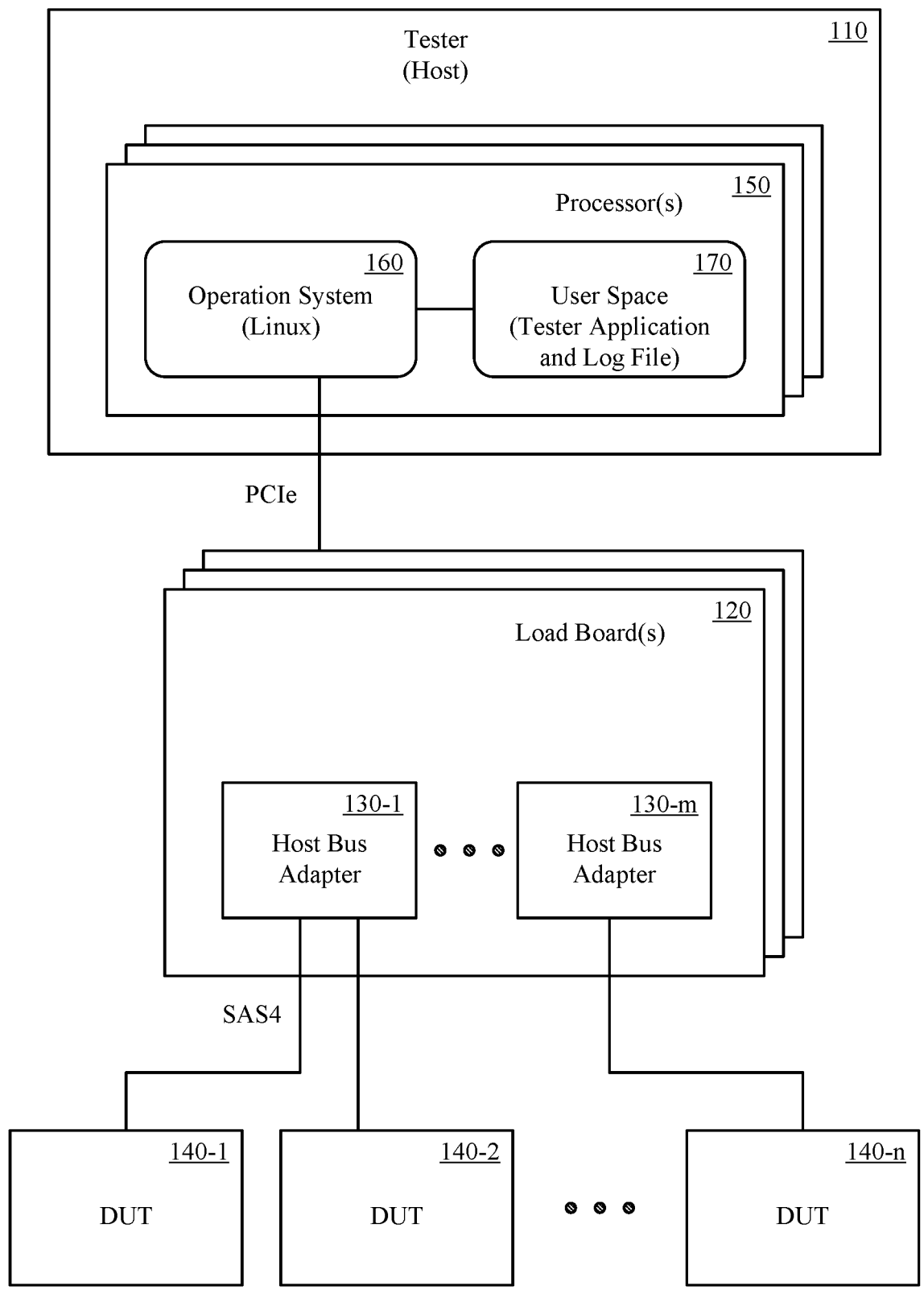
FIG. 1 shows an automatic test equipment (ATE) architecture, in accordance with aspects of the present technology.

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Referring now to FIG. 1, an automatic test equipment (ATE) architecture, in accordance with aspects of the present technology, is shown. The ATE architecture includes a tester 110 coupled to one or more load boards 120. Load boards 120 are also referred to as primitives, handlers or probes. In one implementation, the host device can be implemented by one or more computers running a Linux or Windows operation system (OS), or other computing device and operating system combination, that does not support odd sector size or non-standard sector size memory access. The one or more DUTs 140-1, 140-2, 140-*n* can be represented as block device through the Linux or Windows block layer. The host device of the tester 110 can be communicatively coupled to the one or more load boards 120 by a first communication protocol interface, such as peripheral component interface express (PCIe). One or more devices under test (DUTs) 140-1, 140-2, 140-*n* can be communicatively coupled to the one or more load boards 120 by a second communication protocol interface, such as serial attached small computer system interface (SAS). In one implementation, second communication protocol interface can be a SAS4 interface.

In one implementation, a test application in a user space 170 generates command and test patterns of a test program to test one or more aspects of the one or more DUTs. An operating systems 160 of the host device of the tester 100 can send the commands and test patterns to the one or more load boards 120. In another implementation, the one or more load boards 120 can generate one or more test patterns for corresponding commands of the test program. The one or more load boards 120 can control execution of the commands and test patterns on the one or more DUTs to perform the corresponding testing of the DUTs. The one or more load boards 120 can also provide one or more functions for the testing of the DUTs 140-1, 140-2, 140-*n*. The load boards 120 can for example provide for comparing test results, received from the one or more DUTs in response to the test program, with expected result data. In one implementation, the functions of the one or more load boards 120 can be implemented by one or more field programmable gate arrays (FPGAs), application specific integrated circuits (ASICs), and/or the like. The one or more FPGA or ASIC implemented load boards 120 can provide a SAS4 protocol interface for communication to the one or more DUTs 140-1, 140-2, 140-*n*. The use of one or more load boards 120 reduces the load on the processor(s) 150 of the host device of the tester 110. For example, one or more processors 150 of the host device tester can transfer commands and test patterns to the one or more load boards 120. The one or more load boards 120 can apply the test patterns to respective DUTs 140-1, 140-2, 140-*n* in accordance with the commands. Instead, of returning all the data to the processors 150 of the host device of the tester 110, the one or more load boards 120 can return only result data related to faults detected in response to the test patterns applied to the respective DUTs 140-1, 140-2, 140-*n*.

In one implementation, the one or more load boards 120 can be peripheral component interface express (PCIe) boards. The ATE architecture can also include one or more host bus adapters (HBAs) 130-1, 103-*m* coupled between one or more DUTs 140-1, 140-2, 140-*n* and the one or more load boards 120. In one implementation, the one or more HBAs can provide for communication between the one or more load boards 120 and the one or more DUTs 140-1, 140-2, 140-*n* using a second communication interface, such as one or more SAS communication protocol interfaces. In one implementation, the HBA 130-1, 130-*m* can be a commodity third-party HBA. As used herein, third-party refers to one or more manufacturing entities that differ from the manufacturing entity or entities of the tester 110 and/or load boards 120.

In one implementation, the first and second communication protocol interfaces, along with the translation between the first and second communication protocol interfaces can be programed into the one or more HBAs 130-1, 130-*m*. Accordingly, the one or more HBAs 130-1, 130-*m* can be reconfigurable to support a number of different first and second communication protocol interfaces. In another implementation, the one or more HBAs 130-1, 130-*m* can implement a specific set of first and second communication protocol interfaces, along with the translation between the first and second communication protocol interfaces. If a different set of communication protocol interfaces, along with the translation between them is needed, the HBAs implementing first and second communication protocol interfaces and translation therebetween can be swapped out for different HBAs implementing the different set of communication protocol interfaces and translation therebetween. Furthermore, the one or more HBAs can utilize a log driver module, enable communication protocol interface command, and return logging. For example, a SAS communication protocol driver can utilize the log driver module, enable SAS communication protocol commands and return logging. The communication protocol commands issued during the test and returned results can be extracted and analyzed by a user. The host device tester 110 can provide for lockless data logging and error reporting. In one embodiment, a log memory for storing test results can be pre-allocated.

The tester 110 can include additional modules, components, sub-systems and the like, but are not described herein because they are not need for an understanding of aspects of the present technology. Similarly, the ATE architecture can also include additional modules, components, sub-systems and the like, but are not described herein because they are not need for an understanding of aspects of the present technology.

Figure 2:
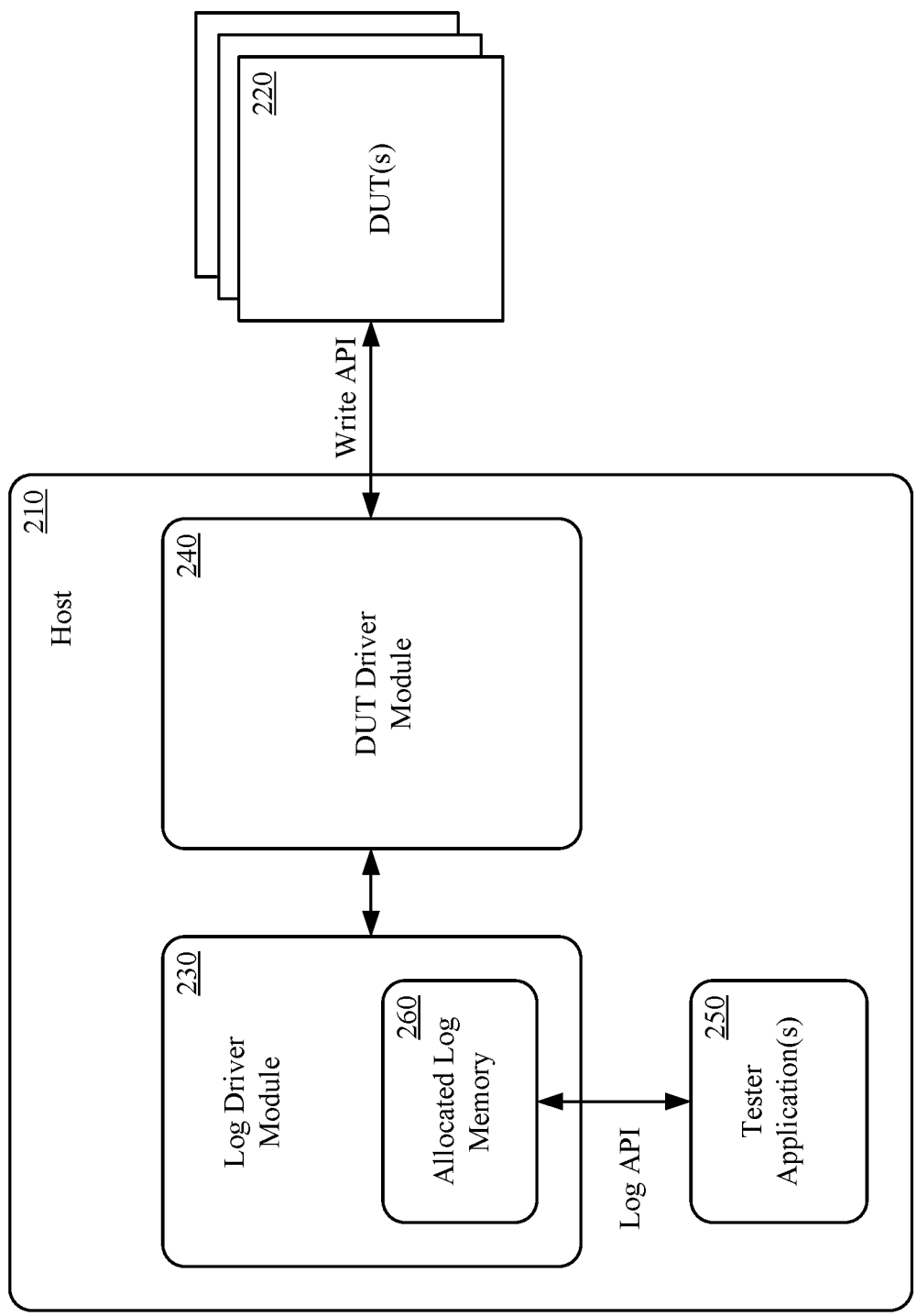
FIG. 2 shows an ATE architecture, in accordance with aspects of the present technology.

Operation of the ATE will be further explained with reference to FIG. 2, which shows further aspects of the ATE architecture. The ATE architecture can include host device tester 210 coupled to one or more DUTs 220. In one implementation, the host device tester 210 can be coupled to the one or more DUTs 220 by one or more load boards (not shown), by one or more load boards and one or more HBAs, or any similar configuration. The host device tester 210 can implement one or more log driver modules 230, one or more DUT driver modules 240, and one or more tester applications 250, in software executing on one or more processors, in firmware, hardware, or any combination thereof. Log memory 260 can be allocated by the log driver module 230, operating system driver module or the like.

Figure 3:
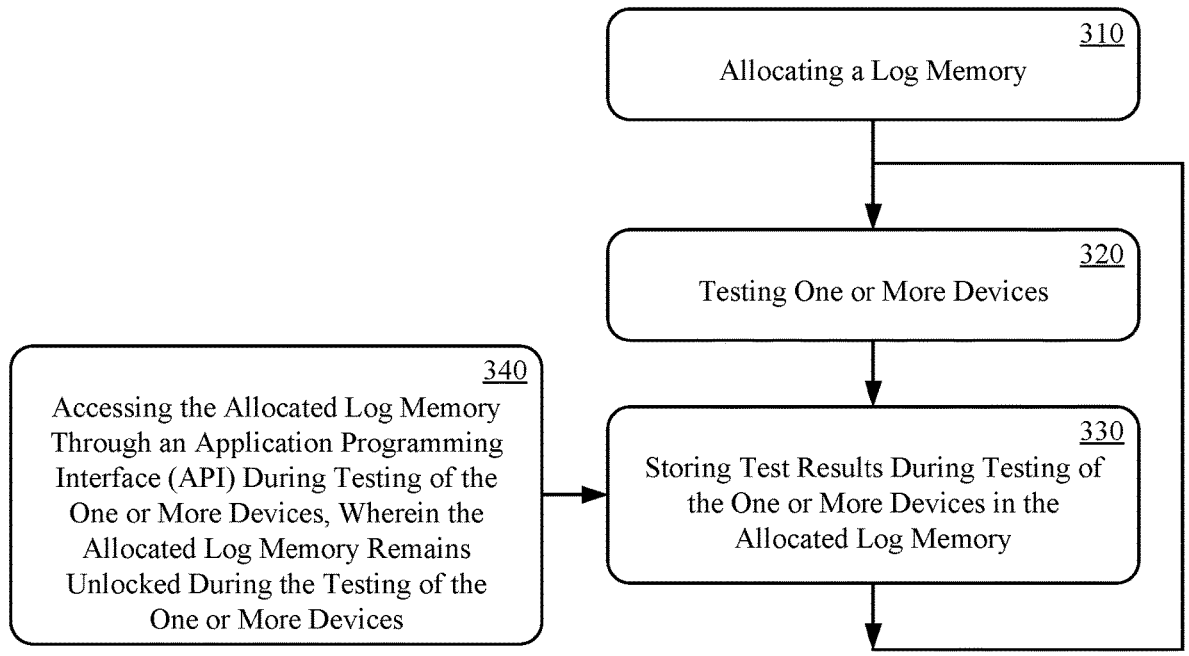
FIG. 3 shows a method of logging test results and accessing the test results during testing of devices under test (DUTs), in accordance with aspects of the present technology.

Operation of the ATE will be further explained with reference to FIG. 3, which shows a method of logging test results and accessing the test results during testing of the one or more DUTs. The method can include allocating a log memory, at 310. The log memory can be pre-allocated for each DUT to be tested. The log memory can be allocated in an operating system driver module. For example, the log memory can be allocated in a Linux operating system driver module. The log memory can be divided, for example, into 2048 entries or more depending on the amount of memory allocated and the size of the entries. In one implementation, the log memory can be allocated as a 256 kilobyte (KB) circular buffer of 2048 entries, or any other selected number of entries, with each entry 128 bytes in size. In most cases, a single log memory for a DUT is sufficient. Alternatively, one log memory per queue can be allocated. For an implementation testing 16 DUTs, 16 log memories can be allocated, wherein the log memory for each DUT being tested can be one megabytes (MB). The operating system kernel module can provide a user space log API for accessing the entries stored in the log memory. In accordance with the log API, the following functions can be supported: clear the log memory; read the entries from the log memory; return log entries to the user for analysis or display; and disable logging to enable maximum test performance. The log memory can also advertise a write API for a storage block device kernel module to write information to the log memory through its kernel module. At 320, one or more devices can be tested. At 330, test results can be stored during testing of the one or more devices in the allocated log memory. The commands submitted to the DUT and the data returned from the DUT can be logged in the log memory. In one implementation, only test fail results are logged in the allocated log memory. In another implementation, all DUT test parameters and results are logged in the allocated log memory. At 340, the allocated log memory can be accessed through an API during testing of the one or more devices, wherein the allocated log memory remains unlocked during the testing of the one or more devices. In most cases, the command submissions to the log memory and the date returned/retrieved from the log memory are used for debug purposes. Accessing the log memory in this way is lockless, which reduces the associated overhead required.

Unlike Linux or Window tracing which captures command and data from all of the DUTs together along with all other software executing on the host tester device, the log driver can store the commands and data for each separate DUT in a respective log allocated for the respective device being tested.

Aspects of the present technology advantageously provide a low overhead solution to logging and error reporting without having to lock a log memory before accessing or modifying the log.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method of testing a device under test (DUT), the method comprising:
   pre-allocating a log memory of a host device for storing test results of the DUT;
   executing a test program to test the DUT; and
   during testing of the DUT, issuing a command to access the log memory using an application programming interface (API), wherein the log memory remains unlocked during the testing of the DUT while test result data is being stored in the log memory and while accessing the test result data using the API.

2. The method of claim 1, wherein pre-allocating the log memory for storing the test results of the DUT comprises pre-allocating log memory in a user space memory.

3. The method of claim 1, wherein pre-allocating the log memory for storing the test results of the DUT comprises pre-allocating the log memory in a Linux kernel module that provides a user space API configured to access entries stored in the log memory.

4. The method of claim 1, wherein the log memory is configured to store 2048 entries.

5. The method of claim 1, wherein the log memory comprises a circular buffer.

6. The method of claim 1, wherein the API comprises at least one of: an instruction to clear the log memory, an instruction to read entries from the log memory, an instruction to return entries from the log memory to a user, and an instruction to disable logging to the log memory.

7. An automatic Test Equipment (ATE) architecture comprising:
a host device tester coupled to a device under test (DUT), the host device tester including;
a user application space;
an operating system kernel space for loading a log driver module and device under test (DUT) driver module in the user application space and allocating log memory for the log driver module, wherein the DUT driver module provides for transferring test parameters and test results for the DUT through a write application programming interface (API) to the allocated log memory of the log driver module during testing of the DUT;
a tester application for enabling, disabling, dumping and clearing log data through a log API to the allocated log memory of the log driver module during the testing of the DUT, and
wherein the allocated log memory remains unlocked during the testing of the DUT.

8. The ATE architecture of claim 7, wherein the allocated log memory includes 2048 or more entries.

9. The ATE architecture of claim 7, wherein the allocated log memory comprises a circular buffer of 256 kilobyte (KB) or more.

10. The ATE architecture of claim 7, wherein test fail data is logged in the allocated log memory.

11. The ATE architecture of claim 7, wherein the most recent test parameters are logged in the allocated log memory.

12. The ATE architecture of claim 7, log API advertises the write API to write information to the allocated log memory through the DUT driver module.

13. The ATE architecture of claim 7, wherein the log API can provide for clearing the allocated log memory; reading entries from the allocated log memory; returning entries from the allocated log memory; and disable logging in the allocated log memory.

14. The ATE architecture of claim 7, wherein the host device tester is communicatively coupled to the DUT by a load board.

15. The ATE architecture of claim 14, wherein:
the load board and the host device tester communicate using a first communication interface; and
the load board includes a host bus interface configured to provide for communication between the load board and the DUT using a second communication interface, and to translate command and data between the first communication interface and the second communication interface.

16. A method of testing a device comprising:
allocating a log memory of a host device;
testing a device under test (DUT) coupled to the host device;
storing test results during the testing of the DUT in the allocated log memory during the testing of the DUT; and
accessing the allocated log memory through an application programming interface (API) during the testing of the DUT, wherein the allocated log memory remains unlocked during the testing of the DUT.

17. The method of testing the device according to claim 16, wherein accessing the allocated log memory includes one or more of: clearing the allocated log memory; reading entries from the allocated log memory; returning entries from the allocated log memory; and disable logging in the allocated log memory.

18. The method of testing the device according to claim 16, wherein the log memory is configured to store 2048 entries in a 256 kilobyte (KB) circular buffer.

19. The method of testing the device according to claim 16, wherein the log memory is allocated for each DUT being tested.

20. The method of testing the device according to claim 16, wherein the log memory is allocated for each queue of the DUT being tested.

* * * * *